United States Patent Office 2,989,108
Patented June 20, 1961

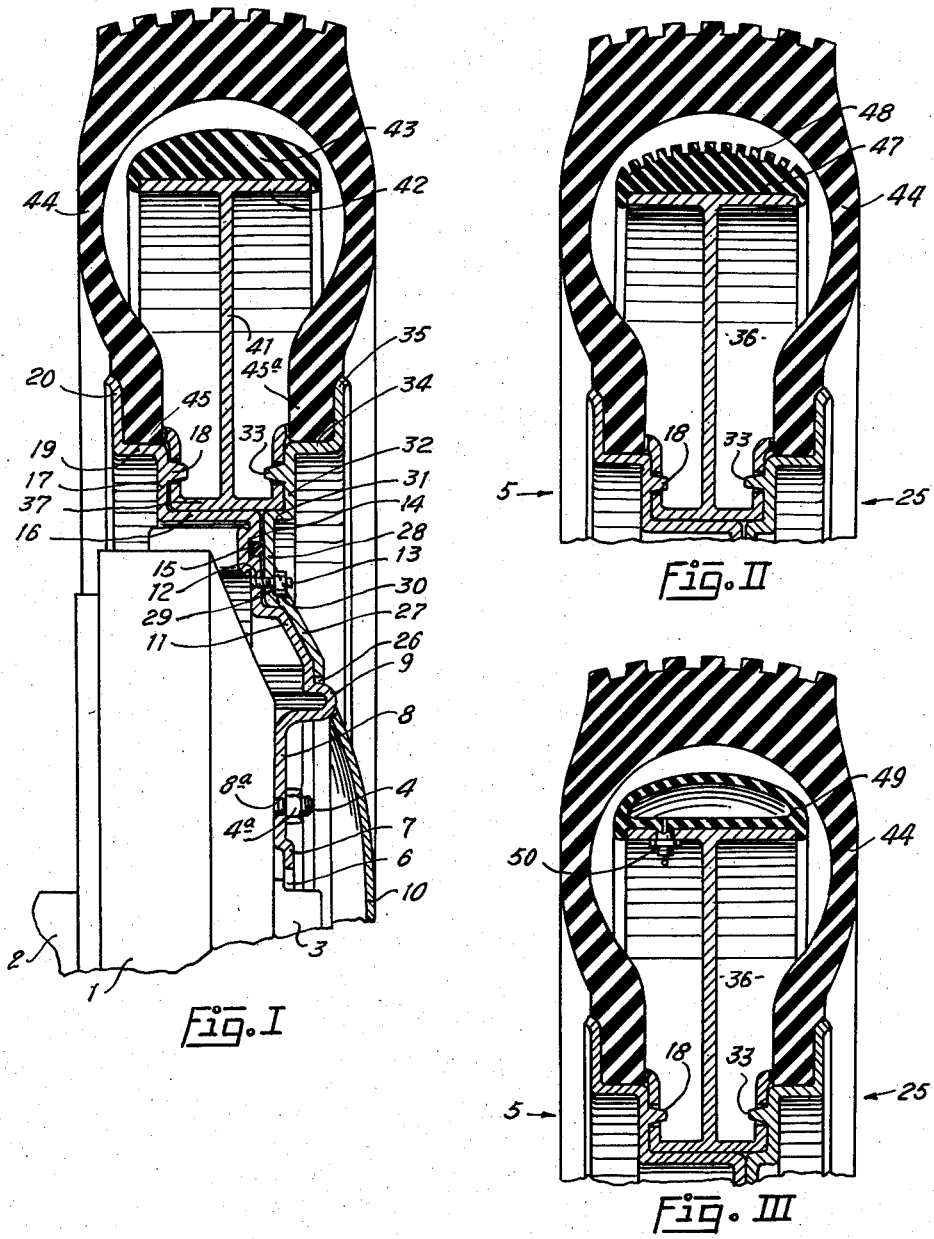

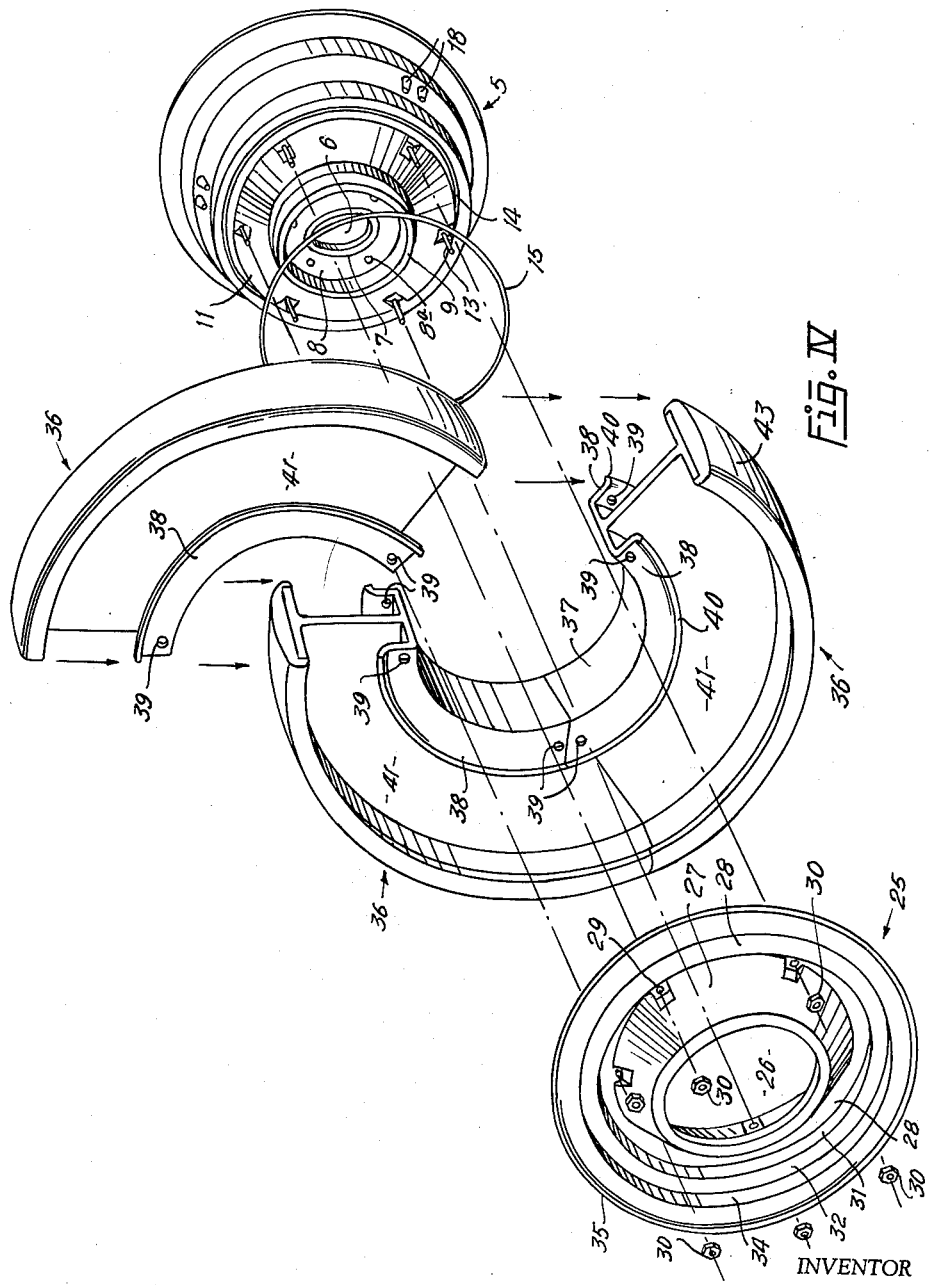

2,989,108
SAFETY TIRE RIM
Jesse L. Gore, Box 466, Aspermont, Tex., assignor of one-half to J. F. Jackson, Grand Saline, Tex.
Filed July 13, 1959, Ser. No. 826,705
5 Claims. (Cl. 152—158)

This invention is concerned with a tire mounting construction and is particularly concerned with means for mounting a tubeless tire on the wheel of an automobile, including a safety rim inside the tire to prevent the tire from collapsing to such an extent to cause the operator to lose control of the vehicle in the event of the tire blowing out; or preventing undue damage to the tire in the event the tire should become flat while the vehicle is in motion.

It also provides a tire mounting in which the tire may be more quickly mounted and dismounted from the vehicle, without removing the wheel, thereby eliminating the necessity for special equipment for mounting and dismounting large oversize tires on vehicles, such as trucks, buses, tractors and heavy road working equipment.

Protective rims placed inside an automobile tire have been heretofore known, but such devices have been impractical and not commercially acceptable by reason of the fact that they were difficult to mount, and difficult to dismount, to such an extent as to discourage the general use thereof.

An important feature of this invention is to provide such a safety rim to be mounted inside the tire of an automobile at the time it is mounted on the wheel of the automobile in such a way as to be quickly and easily mounted and dismounted by the operator of the automobile, without the necessity of special tools and with a minimum amount of labor. Such is accomplished without removing the wheel from the automobile, and actually involves less time and labor than the mounting and dismounting of tires from standard rims, heretofore employed.

In the use of the device constituting the subject matter of this invention the tire may be removed from the wheel by simply removing the outer disc of the two-piece rim, leaving the inner disc of the rim on the hub.

The wheel mounting device employs complementary wheels sections or discs which are so fitted together as to provide a sealing rim or channel for a tubeless tire, and at the same time provides a seal between the sections, to prevent leakage of air from the tire. Mounted in conjunction with the complementary discs is a segmented safety rim which is mounted inside the tire, each segment being mounted separately, and rigidly secured to the tire mounting discs, but being easily disengageable when the outer disc is removed from the wheel.

The only tool needed in mounting and dismounting the tire and the safety rim on the automobile wheel is a wrench to remove nuts from the studs attaching the outer tire mounting disc to the inner tire mounting disc. Such may be done in a quick, simple and easy operation. It is not necessary to remove the wheel or the inner section of the tire mounting rim from the automobile in order to mount and dismount the tire and the safety rim therein.

With the use of the tire mounting device disclosed herein it would not be necessary to carry a spare tire on the automobile, because the safety rim permits the automobile to be driven to a place where the tire may be repaired, and upon removing the outer disc of the two-piece rim, the tire may be removed for repair. A tire could be changed by the operator of the automobile without special tools or skill.

The two-piece rim disclosed herein would be good for the life of the automobile, because there are no parts thereon which are subjected to substantial wear. It could be provided as standard equipment on the automobile, when sold, or it could be made as an attachment to be attached to the automobile after it has been manufactured.

It results in a savings in both life and property, in that the safety rim prevents the collapse of the tire upon a blowout to thereby prevent the operator from losing control of the car and also prevents damage to the tire.

Among the objects attained by this invention, in addition to the foregoing, are the following:

A safety rim for an automobile tire which prevents the collapse of the tire to such an extent as to cause the operator of the automobile to lose control of the automobile or damage the tire.

A safety rim made in three separate segments which may be mounted inside the tire, and on the inner disc of the tire mounting rim, in such a way that it can be mounted and dismounted with a minimum amount of labor and without the employment of special tools.

A rim for an automobile for mounting an automobile tire, made in separate complemnetary parts, whereby when the outer complementary disc element is removed, the tire may be dismounted from the rim to permit repair of the tire, without removing the inner disc or the wheel from the automobile.

Other and further objects of the invention will become apparent upon reading the detailed specification hereinafter following and by referring to the drawings annexed hereto.

In the drawings suitable embodiments of the invention are disclosed wherein:

FIGURE I is a fragmentary cross-sectional, elevational view showing the tire mounting rim, with a safety rim included therewith;

FIGURE II is a fragmentary cross-sectional, elevational view of a tire mounted on the two-piece rim showing a modified form of cap about the outer periphery of the safety rim;

FIGURE III is a view similar to FIGURE II showing another modified type of cap arranged about the periphery of the safety rim;

FIGURE IV is an exploded view of the combination tire mounting rim and safety rim.

Numeral references are employed to designate the various parts shown in the drawings and like numerals designate like parts throughout the various figures of the drawings.

The numeral 1 indicates a conventional wheel cylinder or hub of an automobile wheel which is rotatably mounted upon the axle 2, and is provided with a grease cap 3 on the outer side of the wheel cylinder 1.

A plurality of conventional threaded studs 4 are attached to the wheel cylinder or hub 1 and extend outwardly therefrom being spaced about the grease cap 3.

The threaded studs 4 are adapted to threadedly receive the nuts 4a to secure the inner disc 5 of the two-piece tire rim to the wheel cylinder 1, in the manner which will be hereinafter explained in detail.

The inner disc of the two-piece tire mounting rim, hereinafter described, is generally indicated by the numeral 5.

The inner disc 5 is provided with a central opening 6, which is arranged to pass over and receive the grease cap 3. The inner side of the opening 6 is provided with a lip 7 which extends over and engages the outer periphery of the grease cap 3.

The disc member 5 is contoured to provide a flat face portion 8 resting against the outer face of the wheel cylinder 1, which face portion 8 has stud receiving holes 8a therein through which the threaded studs 4 may pass and extend outwardly thereof, so as to receive the nuts 4a on the outer end thereof to thereby hold the disc 5 to the conventional wheel drum 1.

Disc member 5 is further shaped and formed to provide an outwardly extended head 9, extending circularly thereabout to provide an opening in which may be inserted the conventional wheel cover or hub cap 10.

The disc member 5 is further shaped and angled inwardly as indicated at 11, and is provided with a straight portion 12 having a plurality of threaded studs 13 secured thereto, and extending outwardly therefrom, said studs being spaced peripherally about the outer face of the disc member 5.

The wall portion 12 of the disc member 5 is also formed to provide a peripheral sealing groove 14 thereabout, which is arranged to receive a resilient O-ring seal 15 therein.

The inner disc member 5 is provided with a horizontally extending ledge portion 16 on which the inner flange 37 of the safety rim segments 36 are arranged to rest. Extending upwardly and outwardly at right angle to the horizontal ledge 16 is a wall portion 17, from the inner side of which extend pairs of dowel pins 18 (FIG. IV) which are frusto-conical in shape and arranged to extend through corresponding holes 39 in the ends of the flange members 38 of the safety rim segments 36.

The inner disc member 5 is further formed to provide a horizontal tire receiving ledge 19, having an annular flange 20 extending at right angle thereto. The inner sealing bead 45 of the tire 44 is arranged to sealingly engage the ledge 19 and annular flange 20, when the tire 44 is mounted on the rim.

The outer portion of the two-piece tire mounting rim is formed by an outer disc 25, which has complementary portions to the inner disc 5.

The outer disc 25 includes a circular central passage 26, which is adapted to receive the outwardly extending bead 9 of the inner disc 5.

The outer disc 25 includes an angled wall portion 27 which coincides with the angled wall portion 11 of the inner disc 5.

A straight wall portion 28 coincides with the straight wall portion 12 of inner disc 5 and provides a sealing surface against which the O-ring seal 15 may seal when the disc members 5 and 25 are brought into contact, and forced together, by the studs 13 and nuts 30, upon assembly of the disc members.

A plurality of holes 29 are provided through the wall portion 28 to receive the threaded studs 13.

The outer disc portion 25 is formed to provide a horizontal ledge 31 thereon arranged to receive the base portion or flange 37 of the rim segments 36.

The disc 25 is further formed to provide a vertical wall portion 32, having pairs of dowel pins 33 thereon, which are the same in construction and coinciding in location to the dowel pins 18, provided on the inner disc portion 5. The dowel pins 33 are arranged to pass through coinciding holes 39 in the outer flange 38 of the rim segments 36.

A horizontal sealing ledge 34, having upwardly extending sealing flange 35 thereon, is provided on the rim disc 25 and is adapted to receive the sealing bead 45a on the other side of the tire 44.

The safety rim, constituting an important feature of this invention, includes three complementary segments 36, each of which has a base portion 37, joined by a wall portion 41, to the outer rim portion 42. The base portion 37 includes inwardly extending flanges 38 on each side thereof, having holes 39 provided in the outer ends thereof said holes being arranged to engage with the pairs of dowel pins 18 and 33 on the inner sides of the disc portions 5 and 25 of the rim.

Outwardly extending beads 40 are provided on the outer periphery of the flanges 38 to confine the sealing beads 45 and 45a of the tire 44 to provide a firm and secure seal of the sealing beads of the tire against the rim.

The tire 44 may be any conventional type of tubeless tire, and is mounted on the rim in the manner hereinafter described.

The safety rim is provided on the outer periphery of each of the segments 36 with a resilient covering material 43, such as plastic composition or rubber, which provides a resilient tread to prevent damage to the automobile tire 44 when the tire has been deflated and the vehicle is run thereon. The covering material 43 may be attached to the safety rim in any suitable manner, as by molding it thereto or by interengaging flanges on the safety rim and on the covering material.

The covering material for the safety rim may take different forms. For instance, it could be made of sponge rubber, as shown at 47, having tread ridges 48 formed thereon, which could be attached to the safety rim segments in any suitable manner.

The covering material could also take the form of an inflatable rubber rim 49 which may be inflated by means of a valve 50.

To mount a tire on an automobile, employing the two-piece rim arrangement herein described, the inner disc 5 is first mounted on the wheel drum 1 by placing the holes 8a over the studs 4, and screwing the nuts 4a thereon to secure same to the wheel drum 1. The segments 36 are placed in the tire 44 and the tire is then placed on the inner disc 5, by placing the inner sealing flange 45 thereof on the ledge 19. As the tire is held in place on the ledge 19, the segments 36 of the safety rim are positioned in adjoining relationship on the ledge 16 by passing the dowel pins 18 through the holes 39 of the ends of the adjoining segments 36.

The outer disc 25 is then mounted by slipping the central passage 26 thereof over the outwardly extending bead 9, aligning the holes 29 with the studs 13, passing the studs through such holes, and the dowel pins 33 through holes 39 in the outer flange 38, and screwing the nuts 30 on studs 13 and tightening same in place.

At the same time the outer sealing flange 45a of the tire 44 is positioned on the ledge 34 of the outer disc 25. As the nuts 30 are tightened on the studs 13, the flanges 45 and 45a are confined between the beads 40 and the flanges 20 and 35. Also, as the nuts 30 are tightened on the studs 13, the O-ring seal 15 is sealingly pressed between the inner face of the upwardly extending wall portion 12 and the inner face of the straight wall portion 28. The seal 15 prevents the escape of air from the tire 44 when it is inflated.

It will be seen that the safety rim is rigidly mounted inside the tire in position to protect the tire in the event it becomes deflated while the automobile is in motion and to also protect the safety of the occupants of the automobile.

The safety rim also prevents the tire 44 from rolling off the rim if the tire becomes deflated.

In order to dismount the tire 44 from the rim, it is only necessary to remove the nuts 30 from the studs 13, and remove the outer disc 25. The tire, with the safety rim segments 36 therein, may then be easily pulled from the inner disc 5 by simply pulling outwardly thereon. It is unnecessary to remove the wheel from the automobile, as is the usual custom.

This device would be particularly advantageous in mounting and dismounting truck or bus tires or tires on large road-working machinery in that it is not necessary to remove the wheel from the vehicle in order to repair a tire.

It will be seen that we have provided a construction well designed to carry out the purposes and objects of the invention, and that it constitutes a distinct improvement over devices designed for similar purposes.

I claim:

1. In a tire mounting rim adapted to be mounted on a wheel cylinder; an inner disc-like member; means to detachably connect the said inner disc member to the wheel cylinder; an outer disc-like member; means for detachably connecting the outer disc-like member to the inner disc-like member; seal means between the adjoining faces of the disc-like members; a safety rim mountable on the disc-like members comprised of a plurality of segments; vertical walls on the disc members; pairs of pins extending inwardly of the walls; flanges on the segments; and holes in the ends of the flanges arranged to receive the pins.

2. The combination called for in claim 1 wherein the pins are frusto-conical in shape.

3. The combination called for in claim 1 with the addition of resilient covering material on the outer surface of a segment.

4. The combination called for in claim 3 wherein the covering material comprises an inflatable tire.

5. The combination called for in claim 1 wherein a bead is provided on the outer edge of the segment flanges arranged to engage the sealing bead of a tire.

References Cited in the file of this patent

UNITED STATES PATENTS

| | | |
|---|---|---|
| 2,242,788 | Marks | May 20, 1941 |
| 2,554,385 | Ristvedt | May 22, 1951 |
| 2,775,282 | Kennedy | Dec. 25, 1956 |
| 2,879,825 | Bettasso | Mar. 31, 1959 |
| 2,884,042 | Seaton | Apr. 28, 1959 |

FOREIGN PATENTS

| | | |
|---|---|---|
| 18,424 | Great Britain | 1904 |